United States Patent [19]
Worland

[11] 3,776,621
[45] Dec. 4, 1973

[54] OPTICAL DISPLAY SYSTEM AND METHOD FOR CREATING A THEATRICAL ILLUSION

[75] Inventor: Donovan Worland, San Francisco, Calif.

[73] Assignee: Walter Landor Associates, San Francisco, Calif.

[22] Filed: May 24, 1972

[21] Appl. No.: 256,428

[52] U.S. Cl............................ 352/85, 352/69, 352/86, 350/4
[51] Int. Cl. .............................................. G03b 37/00
[58] Field of Search .................... 352/69, 85, 86, 89, 352/244; 272/1, 2, 3, 8 R, 8 M, 9, 10, 11, 13; 52/6; 350/4

[56] References Cited
UNITED STATES PATENTS

| | | | |
|---|---|---|---|
| 3,502,402 | 3/1970 | Markson | 352/85 X |
| 2,280,206 | 4/1942 | Waller et al. | 52/6 X |
| 718,326 | 1/1903 | Diem | 272/8 M |

*Primary Examiner*—7
*Attorney*—Stanley Bialos

[57] ABSTRACT

An optical display system and method comprises provision of two angularly disposed side mirror surfaces, a bottom mirror surface angularly disposed with respect to the side mirror surfaces, and a projection sceeen angularly disposed with reference to such mirror surfaces. An image projected on the screen provides an object which because of the mirror arrangement creates a plurality of virtual images.

11 Claims, 7 Drawing Figures

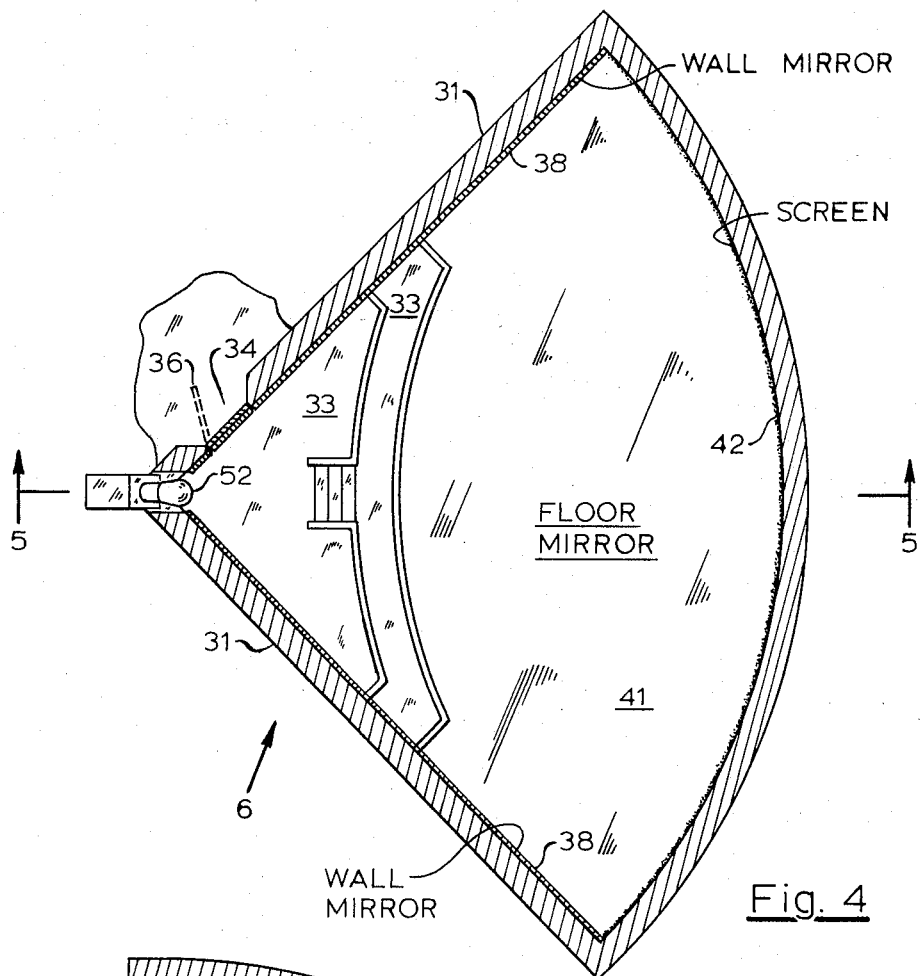
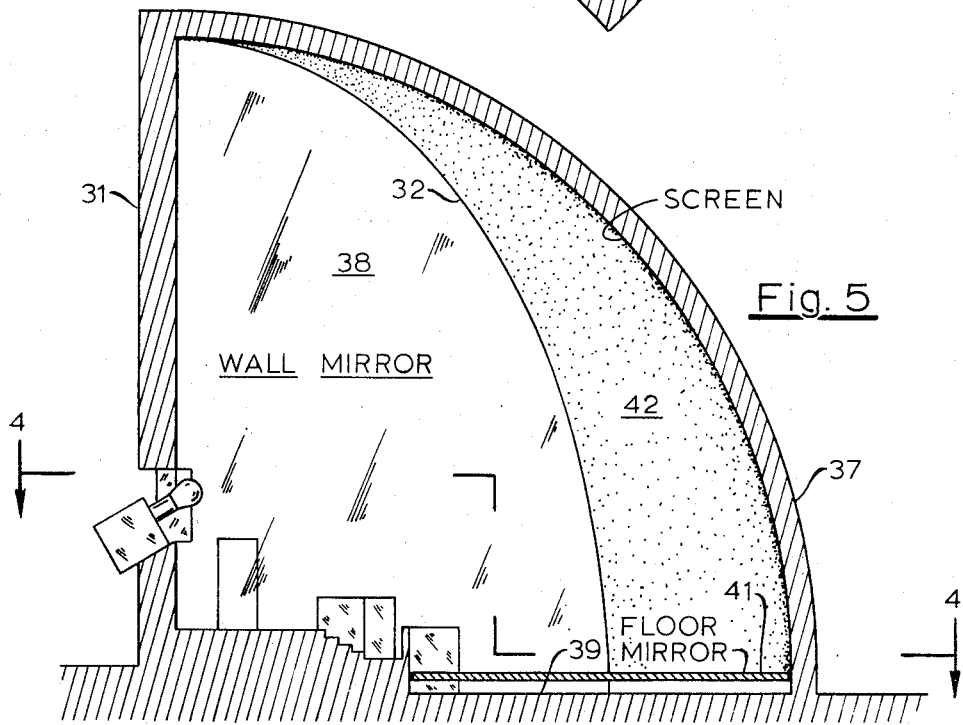

OPTICAL DISPLAY SYSTEM AND METHOD FOR CREATING A THEATRICAL ILLUSION

SUMMARY AND OBJECTS

Summarizing the invention hereof, a system of mirrors is provided comprising two side mirror surfaces angularly disposed with respect to each other, and a bottom mirror surface between the side mirror surfaces. As a result, when an object adjacent the mirrors is viewed by an observer, a plurality of virtual images is seen by the observer. Such object is formed on a projection screen angularly disposed with reference to the mirror surfaces by projection from a projector.

To create a theatrical illusionary effect, the side mirror surfaces are desirably at a 90° angle with respect to each other and with respect to the bottom mirror surface with the front edges of the side mirror surfaces curved in the arc of a great circle from adjacent the top of the apex of the side mirror surfaces to the bottom of such surfaces; and the projection screen is desirably of triangular shape, having the surface shape of a spherical triangle to form with the mirror surfaces an enclosure in the form of a dome of substantially one-eighth of a sphere. As a result, a viewer within the dome has the sensation of being within a hollow sphere with images present above, below and about such viewer.

A viewing area for spectators is provided adjacent the apex between the side wall surfaces; and only a single projector is required for projecting an image onto the screen which is a conventional projection screen. Advantageously, the projector is located adjacent the apex of the quarter dome sufficiently high to project the image above the spectators. To obviate distortion, the projecting system includes a wide angle lens having a substantially spherical surface; and a masking member having a substantially triangular aperture is associated with the lens to conform the image to the triangular screen. The projecting system is preferably such that the projection fills substantially the entire screen.

The image projected onto the screen is the object or objects reflected by the mirrors which provide or form the plurality of virtual images. The term "image" on the screen is employed to include a plurality of images which may be still images or a moving picture. In any event, it is the image on the screen which forms the object reflected by the mirrors to provide the plurality of virtual images.

From the preceding, it is seen that the invention has as its objects, among others, the provision of an improved optical display system which provides an illusionary effect to a viewer by a mirror arrangement which forms a plurality of virtual images of such object, and which is desirably arranged to provide the illusion to a spectator of being within a hollow sphere and seeing images above, below, and around him, and which is yet of simple construction not requiring a complex mirror or projection system. Other objects of the invention will become apparent from the following more detailed description and accompanying drawings in which:

DESCRIPTION OF DRAWINGS

FIG. 4 is a schematic horizontal section of the theatre dome hereof, taken in planes indicated by line 4—4 in FIG. 5;

FIG. 5 is a schematic vertical section taken in a plane indicated by line 5—5 in FIG. 4;

DETAILED DESCRIPTION

Figure 1:
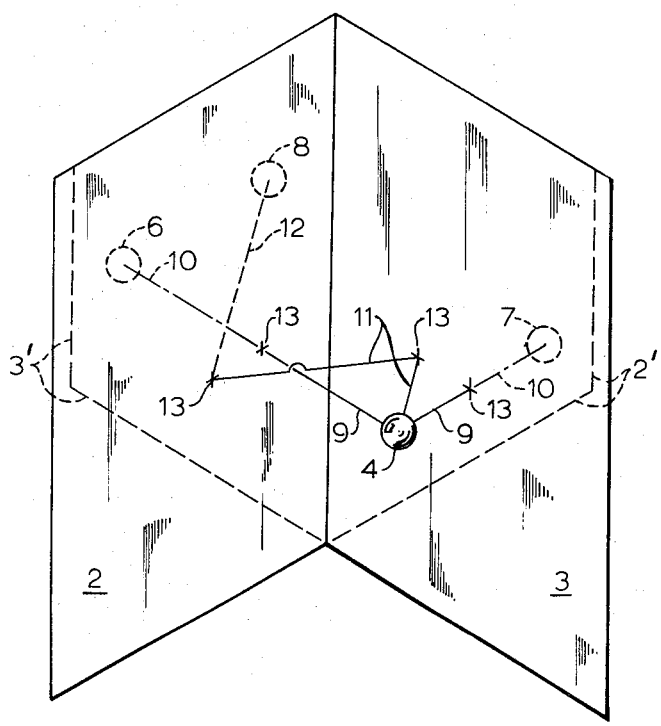
FIG. 1 is a schematic isometric, elevational view, for purposes of explanation, illustrating the formation of virtual images of an object with two side mirror surfaces at a right angle with respect to each other.
Figure 2:
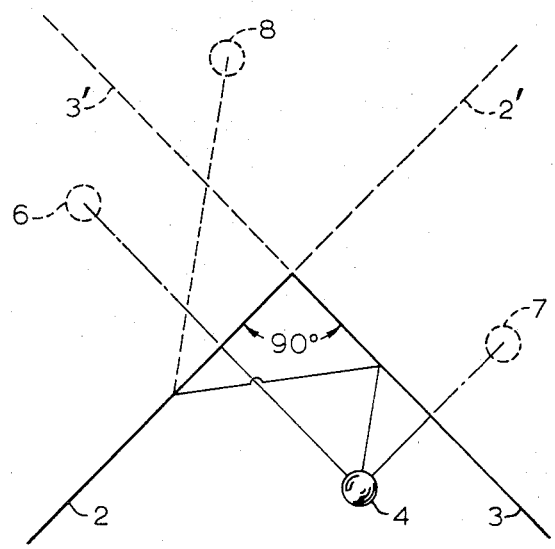
FIG. 2 is a schematic plan view of FIG. 1 to illustrate further the location of virtual images which are present.

Referring to FIG. 1 for purposes of explanation of the instant invention, two side mirror reflecting surfaces 2 and 3 are depicted at an angle of 90° relative to each other; and reflections of these mirrors are indicated at 2' and 3', respectively. It will be noted that an object 4, illustrated schematically as a sphere, positioned between the side mirrors will result in the formation of three virtual images, namely side images 6 and 7, and central image 8, the positions of which will depend upon the position of the viewer and that of the object relative to the mirrors. Each of these virtual images will be the same size as the object and will appear behind the mirrors as is well-known in optics. The solid lines 9 indicate the distances between object 4 and the front of the respective mirrors while the broken lines 10 behind the mirrors indicate the equal distances of the virtual images 6 and 7 behind the mirrors. Solid lines 11 indicate a schematic reflecting ray which results in central virtual image 8 while broken line 12 indicates extension of such ray to central virtual image 8. Crosses 13 indicate the actual planes of the mirrors. FIG. 2 illustrates the position of object 4 and the virtual images 6, 7, and 8 in plan elevation.

Thus, with the two mirrors at a 90° angle with respect to each other as shown, there are always present four images which can be found by the viewer, namely the object or real image 4 and the three virtual images 6, 7 and 8. All of these four images will appear to lie in a circle having its center at the apex of the angle or point intersection of the mirrors. This phenomenon is not limited to mirrors placed at an angle of 90° with reference to each other because if the mirrors are at an angle of, for example, 60° five virtual images can be seen in addition to the object, making six images in all; and at a 45° angle seven virtual images in addition to the object image will be present. The 90° angle is most desirable for the effect to be obtained by the invention hereof for reasons to be explained hereinafter.

Figure 3:
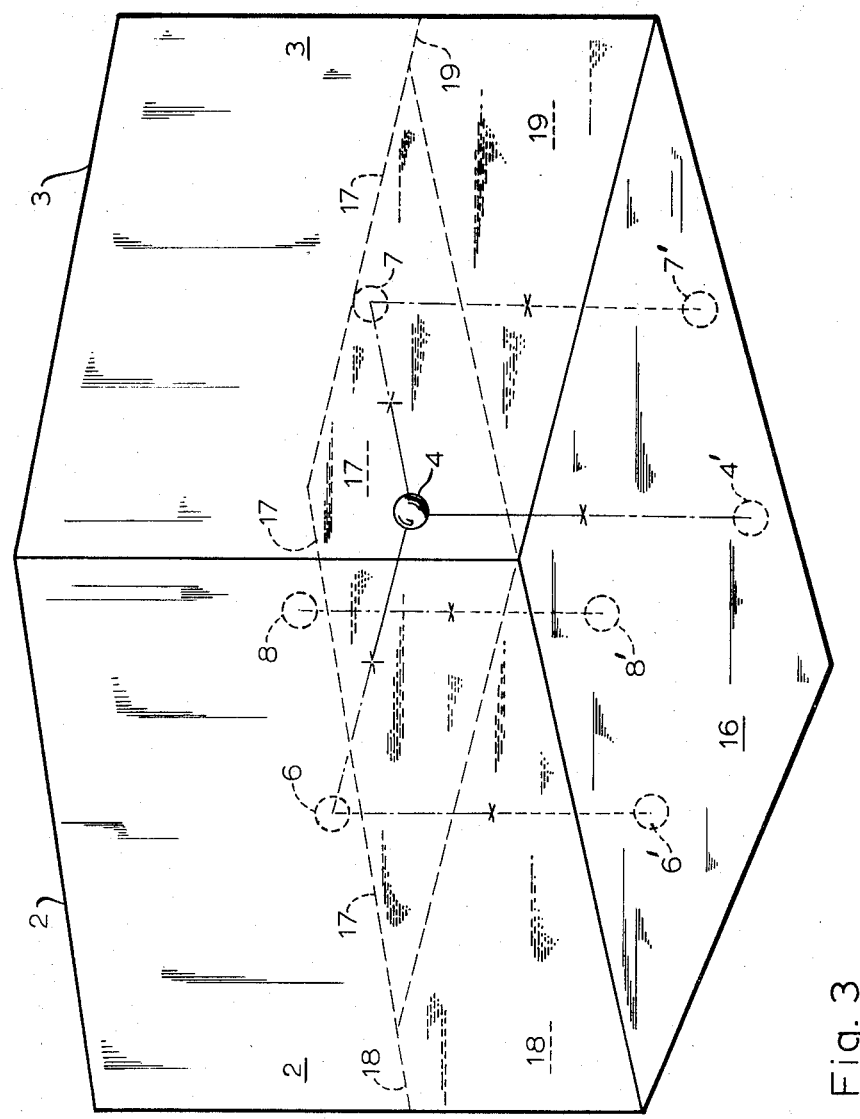
FIG. 3 is a schematic perspective view, illustrating additional virtual images produced below the plane of a bottom mirror surface positioned at a right angle with respect to the 90° angularly related side mirror surfaces shown in FIG. 1; reflections of the side mirrors being omitted for purposes of clarity.
Figure 6:
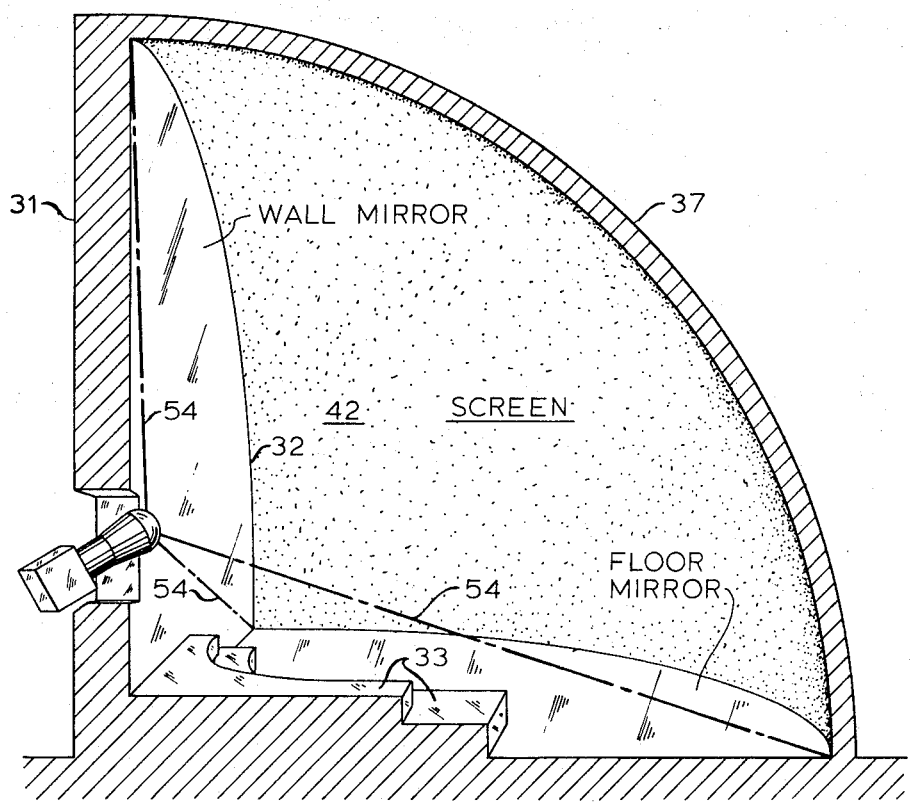
FIG. 6 is a fragmentary schematic sectional elevation looking at an angle indicated by the direction arrow 6 in FIG. 4.

Referring to FIG. 3, the same reference numerals are applied which are employed for the corresponding elements of FIGS. 1 and 2. It illustrates schematically the phenomenon which exists when a bottom or floor mirror 16 is positioned between the side mirrors 2 and 3 and angularly disposed at 90° with respect thereto. First of all, the virtual images of the bottom mirror 16 will be present behind the apex between the side mirrors, and also directly behind the side mirrors, namely virtual image bottom mirror 17 behind the apex, and virtual image bottom mirrors 18 and 19 behind side mirrors 2 and 3, respectively. There are two reflections of the side mirrors above the plane of bottom mirror 16 and four below, but these are omitted for clarity.

A virtual image 4' of object 4 will thus appear below bottom mirror 16, the same distance as object 4 is above such mirror. Likewise, virtual images 6', 7', and 8' of the virtual images 6, 7 and 8, respectively, will appear below the respective virtual image mirrors 18, 19 and 17, respectively, thus providing in all a total of eight images, namely the real object image 4, and seven virtual images 4', 6, 7, 8, 6', 7' and 8'. Four of these images, including the object image 4, will be present in a plane above bottom mirror 16 and four of them in a plane below the bottom mirror; and they will lie on the surface of a sphere, the center of the sphere being at the apex junction of the three mirrors.

In the invention hereof, a floor or bottom mirror, between side mirrors provides the desired additional virtual images below the bottom mirror which are present and which can be observed by a viewer, to produce an unusual illusionary effect when the mirrors are employed in cooperation with a projection screen between the side mirrors. Although illusionary effects can be obtained by having the mirrors angularly disposed at an angle other than 90°, for the desired theatrical effect hereof, it is most advantageous to have the mirrors disposed at a 90° angle relative to each other with a projection screen of one-eighth spherical surface between the side mirrors because a viewer within a one-eighth sphere enclosure formed of such mirrors and screen has the sensation of being within a hollow sphere forming a substantially spherical projection screen and thus seeing images above, below and all around him. In this connection, the foregoing description of FIGS. 1 through 3 refers to a single object as the image for purposes of clarity, but it should be noted that a plurality of objects will produce a multiple effect; and when the object viewed in a motion picture projected onto the projection screen, startling effects are produced as will be described with reference to the theatrical embodiment of the invention illustrated in FIGS. 4 through 7.

The theatre comprises a building structure having side walls 31 at an angle of 90° with respect to each other and which have curved front edges 32 which are 90° arcs of a great circle. These edges curve downwardly from the top of the apex of the angle which the walls make, to their bottom edges. Adjacent the apex is a curved spectator viewing platform 33 which may be provided with seats if desired; and at the rear, one of walls 31 is provided with an entrance 34 which may be closed by door 36. The curved front edges 32 of side walls 31 are connected to a front wall 37 which has the shape of a spherical triangle with its apex between side walls 31 at the top where they meet, and its base at the front of the bottom.

The inside surfaces of side walls 31 are provided with smooth mirror reflecting finishes or with mirrors if so desired, indicated at 38, which cover substantially the entire visible areas of the side walls, and the floor 39 or bottom of the structure is also covered with a smooth mirror or reflecting surface 41. Also the inside surface of front wall 37 is provided with a conventional projection screen surface 42 which is adapted to receive an image, either a still image from a projection slide or a motion picture image, which provides the object from which the multitude of virtual images are produced in the manner described with reference to FIG. 3.

The described enclosure structure is in the form of a dome which is one-eighth of a sphere. As a result, a viewer wihtin the dome on platform 33 has the illusion of being inside a complete optical sphere which forms a projection screen which is substantially a complete hollow sphere, with images above, below and all around the viewer. Such viewer may not see the entire area of the spherical screen at one time but the screen and the images thereon are always present and by looking around all the images can be seen by the viewer.

In the case of a motion picture projection, startling effects are produced. For example, if the projection on the spherical surface, triangular screen depicts a flight of birds, the viewer will observe birds all around him which actually makes him feel as if he is a part of the presentation. Astounding astronomical and other effects can be produced by projections on the screen.

The projection means may be at any suitable point, but it is preferred to position it at the apex of the side mirror surfaces, sufficiently high to clear the heads of the spectators. Such projection system includes a projector (not shown) in association with a wide angle lens 51 having a substantially spherical surface 52 to cooperate with the spherical surface of the projection screen surface 42. A well-known, so-called "Fish eye" type lens having an angle of at least 160° spherical coverage is preferred to obviate distortion, and in this connection, such type of lens has sufficient depth of focus to accommodate the curved projection screen.

Figure 7:
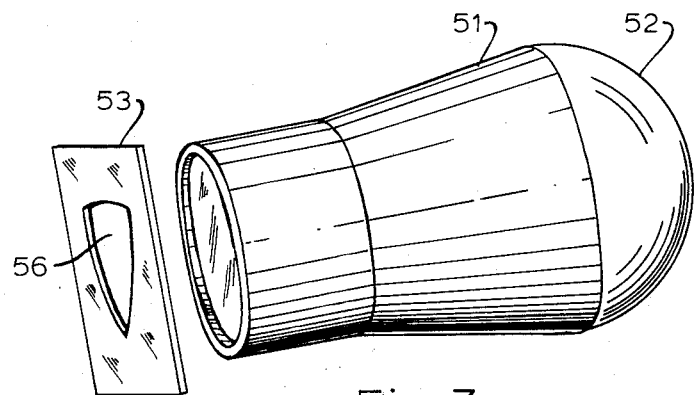
FIG. 7 is an exploded view illustrating a projection lens and the triangularly apertured masking member cooperating with such lens.

Projection screen 42 could be a trangular, flat projection surface. However, if a flat screen is used, then the viewer obtains the illusion of being within a prism rather than within a sphere; and for this reason the spherical surface screen is most desirable. Although it is not necessary to fill the entire screen with the projected image, this is desirable for best effects as is illustrated diagramatically by broken lines 54 in FIG. 6; and because the projection screen is essentially triangular, a masking plate is provided in association with the lens, as shown in FIG. 7, which has an approximately triangular aperture 56 to conform the image to the triangular projection screen.

The one-eighth sphere construction is advantageous because it provides the desired optical illusion with minimum distortion and confusion to the viewer. However, domes of lesser sphere segments may be employed, such as a one-sixteenth sphere, but then the increased number of images may cause excessive confusion to the viewer with accompanying distortion. Spherical sections of greater size than one-eighth will produce a lesser number of virtual images.

Any suitable size may be employed for the theatre, a suitable size being a dome of one-eighth of a sphere of about 50 foot radius with viewing platform 33 as far back of projection screen 42 as convenient so as to have the floor mirror surface in front of the screen of a relatively large area. As illustrated in FIG. 4, the platform is conveniently about one-third away from the apex of the wall mirrors. In such embodiment the projector is preferably located about twelve feet above the floor mirror surface.

I claim:

1. An optical display system creating the effect to a viewer of being above within a substantially complete hollow sphere with images all around him comprising a floor having a circularly curved front edge and opposite substantially straight side edges meeting substantially at an angle to form an apex rearwardly of said curved front edge, a viewing station between said curved front edge and said apex, a projection screen having the shape of a spherical triangle extending upwardly from said curved front edge of the floor and over said viewing station and having circularly curved side edges which substantially meet at an apex aove said floor apex, a pair of side wall reflecting surfaces extending from such apices and having substantially circularly curved front edges substantially meeting the curved side edges of said screen, each of said substantially circularly curved front edges having a radius of curvature substantially equal to the length of said side edges, the curvature of said projection screen conforming substantially to the curvature of said front edges, a reflecting surface on said floor between said side wall reflecting surfaces and extending rearwardly from said screen, and means for projecting an image on said screen.

2. The optical display system of claim 1 wherein a projecting system including a wide angle lens is provided to project an image onto said projection screen, and a masking member having a substantially triangular aperture is cooperable with said lens to conform the image to the screen.

3. The optical display system of claim 2 wherein the projected image is a still image.

4. The optical display system of claim 2 wherein the projected image is a motion picture.

5. The optical display system of claim 1 wherein each of said curved edges defines an arc of substantially 90° to provide an enclosed dome which is one-eighth of a sphere.

6. An optically created hollow projection screen comprising two side reflecting surfaces each having curved front edges substantially 90° of an arc of a circle and two straight edges forming substantially a right angle, said two surfaces being angularly disposed with respect to each other with their straight edges substantially meeting, a floor reflecting surface between said side reflecting surfaces and having a curved front edge which is substantially 90° of the arc of a circle, and a single projection screen having the shape of a spherical triangle with curved edges substantially meeting the curved edges of said floor and side reflecting surfaces.

7. The optically created hollow projection screen of claim 15 wherein the screen is a one-eighth spherical triangular surface, and forms a one-eighth spherical dome with said reflecting surfaces.

8. A theatre having an optical display system for creating the effect to a viewer within the theatre of being within a hollow sphere and observing a plurality of images which are present above, below, and about such viewer, comprising a dome which is substantially one-eighth of a sphere, having side wall mirror surfaces disposed at a substantially 90° angle with respect to each other, a bottom floor mirror surface disposed at a substantially 90° angle with respect to said side wall mirror surfaces, and a single projection screen having the surface shape of a spherical triangle angularly disposed with respect to said side wall and bottom floor mirror surfaces; an area adjacent the apex between said side wall surfaces for spectators; and means for projecting an image onto said screen including a wide angle lens having a substantially spherical surface, and a masking member cooperable with said lens having a substantially triangular aperture to conform the image to said screen.

9. The theatre of claim 8 wherein said mirror surfaces are planar smooth.

10. The method of creating an optical illusion to a viewer of observing a plurality of images of an object which comprises projecting an image on a projection screen which is 1/8 of a sphere to form such object, providing a pair of side mirror surfaces disposed at substantially a right angle to each other leading from front curved edges of said screen to form a plurality of virtual images of said object, and providing a bottom mirror surface meeting the bottom curved edge of said screen and angularly disposed at substantially right angles with respect to said side mirror surfaces to form additional virtual images of said first mentioned virtual images.

11. The method of claim 10 wherein the mirror surfaces and screen form an enclosed dome which is substantially one-eighth of a sphere to create the illusion of a viewer within the dome being within a hollow sphere.

* * * * *

UNITED STATES PATENT OFFICE
CERTIFICATE OF CORRECTION

Patent No. 3,776,621      Dated December 4, 1973

Inventor(s) Donovan Worland

It is certified that error appears in the above-identified patent and that said Letters Patent are hereby corrected as shown below:

Column 3, line 40, "in" should read --is--; Column 4, line 66 (Claim 1, line 2 of the Claim), "above" should read --entirely--; Column 6, line 4 (Claim 7, line 2 of the Claim), numeral "15" should read --6--.

Signed and sealed this 16th day of April 1974.

(SEAL)
Attest:

EDWARD M. FLETCHER
Attesting Officer

C. MARSHALL DANN
Commissioner of Patents